United States Patent
Chaplin et al.

(10) Patent No.: US 9,783,636 B2
(45) Date of Patent: Oct. 10, 2017

(54) POLYMERIC MATERIALS

(71) Applicant: Victrex Manufacturing Limited, Lancashire (GB)

(72) Inventors: Adam Chaplin, Lancashire (GB); Graham Webster, Victoria (AU); Kathryn Warmington, Lancashire (GB); Richard Luke Ainsworth, Lancashire (GB)

(73) Assignee: Victrex Manufacturing Limited, Lancashire (GB)

( * ) Notice: Subject to any disclaimer, the term of this patent is extended or adjusted under 35 U.S.C. 154(b) by 0 days.

(21) Appl. No.: 14/902,717

(22) PCT Filed: Jul. 1, 2014

(86) PCT No.: PCT/GB2014/051988
§ 371 (c)(1),
(2) Date: Jan. 4, 2016

(87) PCT Pub. No.: WO2015/001327
PCT Pub. Date: Jan. 8, 2015

(65) Prior Publication Data
US 2016/0177031 A1    Jun. 23, 2016

(30) Foreign Application Priority Data
Jul. 3, 2013 (GB) .................................. 1311952.4

(51) Int. Cl.
*C08G 65/40* (2006.01)
*C08L 71/00* (2006.01)

(52) U.S. Cl.
CPC .......... *C08G 65/4012* (2013.01); *C08G 65/40* (2013.01); *C08L 71/00* (2013.01); *C08G 2650/40* (2013.01)

(58) Field of Classification Search
CPC ................ C08G 65/4012; C08G 65/40; C08G 2650/40; C08L 71/00
(Continued)

(56) References Cited

U.S. PATENT DOCUMENTS 4,766,197 A    8/1988    Clendinning et al.
4,829,143 A *  5/1989    Clendinning ...... C08G 65/4012
                                                          528/125

(Continued)

FOREIGN PATENT DOCUMENTS

EP    0176989    4/1986
EP    0332012    9/1989
(Continued)

OTHER PUBLICATIONS

EIC/STIC search results, p. 1-30, conducted Jun. 7, 2017.*
(Continued)

*Primary Examiner* — James Yager
*Assistant Examiner* — Kevin Ortman, Jr.
(74) *Attorney, Agent, or Firm* — Michael Best & Friedrich LLP

(57) ABSTRACT

Polymeric materials for use in challenging situations in the oil and gas industry (e.g. challenging physical and chemical environments) are described. The polymeric materials comprise a polymeric material having a repeat unit of formula I and a repeat unit of formula II wherein Ph represents a phenylene moiety; wherein the repeat units I and II are in the relative molar proportions 95:5 to 80:20.

20 Claims, 2 Drawing Sheets

(58) Field of Classification Search
USPC ..... 528/128; 428/195.1, 402, 164, 172, 214,
428/216, 220, 221, 327, 32.6, 354,
428/355 AC, 36.9, 394, 412, 418, 41.8,
428/425.8, 425.9, 457, 458, 522, 600,
428/446, 36.91, 411.1, 212, 218, 447,
428/141, 156, 300.1, 323, 332, 419, 426,
428/704, 304.4, 305.5, 315.5, 316.6, 328,
428/35.7, 36.92, 401, 402.2, 480, 100,
428/116, 138, 1.1, 209, 219, 297.4, 300.4,
428/301.1, 312.2, 312; 525/471, 905, 906
See application file for complete search history.

(56) References Cited

U.S. PATENT DOCUMENTS 5,264,274 A * 11/1993 Shigeta ............... B29C 43/12
428/402

8,865,281 B2 * 10/2014 Axelrad ............... C08L 71/00
428/36.92

2013/0112409 A1 5/2013 Baleno et al.

FOREIGN PATENT DOCUMENTS

EP 2067823 6/2009
GB 2495624 4/2013
WO 2004016419 2/2004

OTHER PUBLICATIONS

International Search Report and Written Opinion for Application No. PCT/GB2014/051988 dated Nov. 24, 2014 (6 pages).
United Kingdom Search Report for Application No. GB1411667.7 dated Dec. 19, 2014 (1 page).

* cited by examiner

POLYMERIC MATERIALS

BACKGROUND OF THE INVENTION

The invention relates to polymeric materials and particularly, although not exclusively, relates to polymeric materials for use in applications wherein the material is subject to high temperature, high pressure and corrosive chemicals, for example in oil and/or gas installations.

One of the most challenging environments in which a material may be used is underground in oil and gas production. In oil and/or gas production, materials may be subjected to high temperatures, high pressure and corrosive chemicals such as sour gas which is natural gas which includes significant amounts of hydrogen sulphide.

Often it is necessary to provide a seal between components which are part of an oil and gas installation. For example O-rings are often used in a valve where a seal is required between a valve shaft and valve housing. However, when O-rings are used in high pressure environments, the O-ring may have a tendency to extrude into the gap between the parts, resulting in failure of the seal. To address this problem, back-up rings are used in conjunction with O-rings, as illustrated in FIG. 1.

Referring to FIG. 1, there is shown a first circular cross-section part 2 within a second circular cross-section part 4. An elastomeric O-ring 6 is provided between the parts 2, 4 to seal the gap 8 therebetween. The parts 2, 4 are subjected to fluid pressure of for example up to 30,000 psi (207 Pa) (illustrated by arrows 10) and a temperature of about 500° F. and corrosive chemicals such as sour gas may be present. Under such conditions, there would be a tendency for seal 6 to extrude into gap 12 unless a back-up ring 14 was provided. Back-up ring 14 may comprise an endless single turn ring or may comprise a spiral. It is arranged to prevent extrusion of O-ring 6. Additionally, the back-up ring itself needs to resist extrusion into gap 12, when subject to the extreme conditions referred to.

It is very challenging to select a polymeric material which is able to withstand the harsh conditions encountered in oil and gas installations, for example subterranean installations. For example, polyetheretherketone (PEEK) is a high performance semi-crystalline polymer which is used in oil and gas applications. It has a very high chemical resistance; however, when used, for example, for a back-up ring, it extrudes significantly over time. Polyetherketone (PEK) is also used in the oil and gas industry. However, despite the fact it is highly crystalline, it is found to have poor chemical resistance to, for example sour gas, leading to its premature failure in use. Other semi-crystalline polymers such as polyetherketoneetherketoneketone (PEKEKK) also are found to show low corrosion resistance to sour gas and/or other fluids present in oil and gas environments.

SUMMARY OF THE INVENTION

It is an object of the present invention to address the above described problems.

According to a first aspect of the invention, there is provided an oil and/or gas installation or apparatus for use in relation to an oil and/or gas installation, said installation or apparatus comprising a component which comprises a polymeric material having a repeat unit of formula

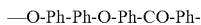   I and a repeat unit of formula

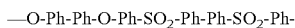   II wherein Ph represents a phenylene moiety;

wherein the repeat units I and II are in the relative molar proportions 95:5 to 80:20.

Suitably, said oil and/or gas installation and/or said apparatus is associated with both oil and gas, wherein said oil and gas comprises a naturally occurring hydrocarbon which is extracted from the ground. Hydrogen sulphide and/or sour gas may be present in or associated with the installation or apparatus, for example, so parts of the installation or apparatus (e.g. said component) may contact the hydrogen sulphide and/or sour gas in use.

Said apparatus for use in relation to an oil and/or gas installation may comprise apparatus which is temporarily or intermittently used in relation to an oil and/or gas installation. For example, such an apparatus may be arranged to be introduced into a subterranean formation with which an oil and/or gas installation is associated in order to carry out a task on or in relation to the formation or installation. For example, the apparatus may comprise a drilling installation or a pipe or tubing (e.g. coil tubing) arranged to be introduced into the formation.

Said oil and/or gas installation may be a production installation.

Said oil and/or gas installation may be arranged, at least partially, underground.

Said oil and/or gas installation preferably comprises a subterranean installation (i.e. an installation arranged underground) which is optionally operatively connected to an installation above ground which may be associated with the transport of oil and/or gas. Said subterranean formation or said installation above ground may comprise said component. Preferably, said subterranean formation comprises said component.

Preferably, said installation or apparatus comprising said component is/are arranged underground.

Said first aspect preferably provides an oil and/or gas installation (rather than said apparatus for use in such an installation).

Said component may be positioned so it is subjected to a temperature of greater than 100° C., greater than 150° C. or greater than 200° C. in use. It may be subjected to temperature of less than 350° C. or 300° C. in use.

Said component may be positioned so it is subjected to a pressure of greater than 40 MPa, 80 MPa, 120 MPa or 180 MPa. It may be subjected to a pressure of less than 300 MPa, less than 260 MPa or less than 220 MPa.

Said component may be positioned so it contacts gas, for example hydrogen sulphide-containing gas in use.

Said component may, at the same time, be subjected to at least two (preferably all three) of the following: a temperature as described (e.g. in the range 150° C. to 350° C.), a pressure as described (e.g. in the range 40 MPa to 300 MPa), and a gas, for example an acidic gas such as containing hydrogen sulphide.

Said component may be selected from the following (which are suitably oil and gas applications: Seals, back-up rings, plugs and packers, motor winding slot liners, protector thrust bearings, motor pot heads, compressor vanes, bearings and bushes, thrust washers, valve plates and high pressure hoses, downhole sensors, marine risers, subsea umbilicals, hoses and sheaths.

In a preferred embodiment, said component which comprises said polymeric material is arranged to guide the flow of a fluid, restrict the flow of a fluid, facilitate movement between two parts, facilitate support of one or more parts and/or facilitate connection of two or more parts.

A component which guides flow of a fluid may comprise a carrier for oil and/or gas such as a hose (e.g. a high pressure hose), a riser, a subsea umbilical or a sheath. Such a component may be a part of an internal surface of the carrier which is arranged to directly contact fluid being guided in use.

A component which restricts the flow of a fluid may comprise a seal, back-up ring or plug.

A component which facilitates movement between two parts, facilitates supports of one or more parts or facilitates connection of two or more parts may comprise bearings (e.g. protector thrust bearings), bushes, washers (e.g. thrust washers) or valve plates.

Said polymeric material of said component may be arranged to directly contact oil and/or gas associated with said installation in use.

Said component which comprises said polymeric material is preferably a seal (e.g. an O-ring) or back-up ring.

The phenylene moieties (Ph) in each repeat unit may independently have 1,4-para linkages to atoms to which they are bonded or 1,3-meta linkages. Where a phenylene moiety includes 1,3-linkages, the moiety will be in the amorphous phase of the polymer. Crystalline phases will include phenylene moieties with 1,4-linkages. It is preferred for the polymeric material to be highly crystalline and, accordingly, the polymeric material preferably includes high levels of phenylene moieties with 1,4-linkages.

In a preferred embodiment, at least 95%, preferably at least 99%, of the number of phenylene moieties (Ph) in the repeat unit of formula I have 1,4-linkages to moieties to which they are bonded. It is especially preferred that each phenylene moiety in the repeat unit of formula I has 1,4-linkages to moieties to which it is bonded.

In a preferred embodiment, at least 95%, preferably at least 99%, of the number of phenylene moieties (Ph) in the repeat unit of formula II have 1,4-linkages to moieties to which they are bonded. It is especially preferred that each phenylene moiety in the repeat unit of formula II has 1,4-linkages to moieties to which it is bonded.

Preferably, the phenylene moieties in repeat unit of formula I are unsubstituted. Preferably, the phenylene moieties in repeat unit of formula II are unsubstituted.

Said repeat unit of formula I suitably has the structure

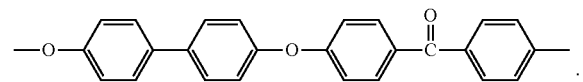

III

Said repeat unit of formula II suitably has the structure

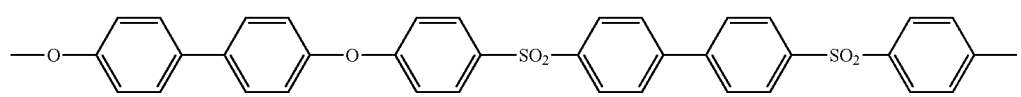

IV

Said polymeric material may include at least 81 mol %, preferably at least 82 mol % of repeat units of formula I. Particular advantageous polymeric materials may include at least 83 mol %, or, especially, at least 84 mol % of repeat units of formula I. Said polymeric material may include less than 90 mol %, suitably 88 mol % or less of repeat units of formula I. Said polymeric material may include 81 to 91 mol %, preferably 82 to 88 mol %, more preferably 84 to 86 mol % of units of formula I.

Said polymeric material may include at least 10 mol %, preferably at least 12 mol %, of repeat units of formula II. Said polymeric material may include less than 19 mol %, preferably less than 18 mol % of repeat units of formula II. Particularly advantageous polymeric materials may include 17 mol % or less; or 16 mol % or less of repeat units of formula II. Said polymeric material may include 9 to 19 mol %, preferably 12 to 18 mol %, more preferably 14 to 16 mol % of units of formula II.

The sum of the mol % of units of formula I and II in said polymeric material is suitably at least 95 mol %, is preferably at least 98 mol %, is more preferably at least 99 mol % and, especially, is about 100 mol %.

The ratio defined as the mol % of units of formula I divided by the mol % of units of formula II in said polymeric material may be in the range 4.2 to 9.0, is suitably in the range 4.8 to 7.3 and is preferably in the range 5.2 to 6.2.

The Tm of said polymeric material (suitably measured as described herein) may be less than 430° C., is suitably less than 420° C., is preferably less than 410° C. The Tm may be greater than 320° C., or greater than 330° C., 340° C. or 350° C. The Tm is preferably in the range 350° C. to 410° C.

The Tg of said polymeric material (suitably measured as described herein) may be greater than 160° C., preferably greater than 170° C., more preferably 180° C. or greater. The Tg may be less than 240° C., less than 220° C. The Tg is preferably in the range 180° C. to 220° C.

The difference (Tm–Tg) between the Tm and Tg may be at least 160° C., preferably at least 180° C., more preferably at least 190° C. The difference may be less than 250° C. or less than 210° C. In a preferred embodiment, the difference is in the range 200° C. to 220° C.

In a preferred embodiment, said polymeric material has a Tg in the range 180° C. to 220° C., a Tm in the range 350° C. to 400° C. and the difference between the Tm and Tg is in the range 200° C. to 220° C.

Said polymeric material may have a crystallinity measured as described in Example 2 of at least 25%, preferably at least 30%. The crystallinity may be less than 50%, for example less than 45%.

Said polymeric material suitably has a melt viscosity (MV) of at least 0.05 kNsm$^{-2}$, preferably has a MV of at least 0.10 kNsm$^{-2}$, more preferably at least 0.20 kNsm$^{-2}$, especially at least 0.25 kNsm$^{-2}$. MV is suitably measured using capillary rheometry operating at 435° C. at a shear rate of 1000 s$^{-1}$ using a tungsten carbide die, 0.5 mm×3.175 mm, as described in Example 3. Said polymeric material may have a MV of less than 2.0 kNsm$^{-2}$, suitably less than 1.2 kNsm$^{-2}$.

Said polymeric material may have a tensile strength, measured in accordance with ISO527 of at least 40 MPa, preferably at least 60 MPa, more preferably at least 80 MPa. The tensile strength is preferably in the range 80 MPa to 110 MPa, more preferably in the range 80 MPa to 100 MPa.

Said polymeric material may have a flexural strength, measured in accordance with ISO178 of at least 130 MPa.

The flexural strength is preferably in the range 135 MPa to 180 MPa, more preferably in the range 140 MPa to 150 MPa.

Said polymeric material may have a flexural modulus, measured in accordance with ISO178 of at least 2 GPa, preferably at least 3 GPa. The flexural modulus is preferably in the range 3.0 GPa to 4.5 GPa, more preferably in the range 3.0 GPa to 4.0 GPa.

Said polymeric material may be part of a composition which may include said polymeric material and a filler means. Said filler means may include a fibrous filler or a non-fibrous filler. Said filler means may include both a fibrous filler and a non-fibrous filler. A said fibrous filler may be continuous or discontinuous.

A said fibrous filler may be selected from inorganic fibrous materials, non-melting and high-melting organic fibrous materials, such as aramid fibres, and carbon fibre.

A said fibrous filler may be selected from glass fibre, carbon fibre, asbestos fibre, silica fibre, alumina fibre, zirconia fibre, boron nitride fibre, silicon nitride fibre, boron fibre, fluorocarbon resin fibre and potassium titanate fibre. Preferred fibrous fillers are glass fibre and carbon fibre.

A fibrous filler may comprise nanofibres.

A said non-fibrous filler may be selected from mica, silica, talc, alumina, kaolin, calcium sulfate, calcium carbonate, titanium oxide, ferrite, clay, glass powder, zinc oxide, nickel carbonate, iron oxide, quartz powder, magnesium carbonate, fluorocarbon resin, graphite, carbon powder, nanotubes and barium sulfate. The non-fibrous fillers may be introduced in the form of powder or flaky particles.

Preferably, said filler means comprises one or more fillers selected from glass fibre, carbon fibre, carbon black and a fluorocarbon resin. More preferably, said filler means comprises glass fibre or carbon fibre.

A composition as described may include 20 wt % to 99.9 wt % (e.g. 20 wt % to 70 wt %) of said polymeric material and 0.1 wt % to 80 wt % (e.g. 30 wt % to 80 wt %) of filler means. Preferred embodiments include greater than 10 wt %, more preferably greater than 40 wt % of filler means.

Said component which comprises said polymeric material may include at least 10 wt %, suitably at least 30 wt %, preferably at least 50 wt %, more preferably at least 75 wt %, especially at least 90 wt % of said polymeric material. Said component may consist essentially of said polymeric material.

Said component which comprises said polymeric material may comprise a composition which includes said polymeric material and filler means. Said fillers may be as described above.

Said component which includes said polymeric material may include at least 1 g, at least 5 g or at least 10 g or said polymeric material.

According to a second aspect of the invention, there is provided a component (preferably for an oil and/or gas installation), which comprises a polymeric material according to the first aspect, wherein said component is of a type which is arranged to guide the flow of a fluid, facilitate movement between two parts, facilitate support of one or more parts and/or facilitate connection of two or more parts.

A component which guides flow of a fluid may comprise a carrier for oil and/or gas such as a hose (e.g. a high pressure hose), a riser, a subsea umbilical or a sheath. Such a component may be a part of an internal surface of the carrier which is arranged to directly contact fluid being guided in use.

A component which restricts the flow of a fluid may comprise a seal, back-up ring or plug.

A component which facilitates movement between two parts, facilitates supports of one or more parts or facilitates connection of two or more parts may comprise bearings (e.g. protector thrust bearings), bushes, washers (e.g. thrust washers) or valve plates.

Said polymeric material of said component may be arranged to directly contact oil and/or gas associated with said installation in use.

Said component which comprises said polymeric material is preferably a seal (e.g. an O-ring) or back-up ring.

According to a third aspect there is provided a method of assembling a part of an oil and/or gas installation, the method comprising:

(i) selecting a component which comprises a polymeric material or selecting apparatus or a device for use in relation to the oil and/or gas installation which comprises said polymeric material;

(ii) introducing said component, apparatus or device into said oil and/or gas installation;

wherein said polymeric material has a repeat unit of formula

—O-Ph-Ph-O-Ph-CO-Ph-         I and a repeat unit of formula

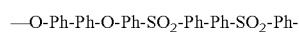

—O-Ph-Ph-O-Ph-SO$_2$-Ph-Ph-SO$_2$-Ph-    II wherein Ph represents a phenylene moiety;

wherein the repeat units I and II are in the relative molar proportions 95:5 to 80:20.

The method may include positioning said component, apparatus or device in said oil and/or gas installation.

Said polymeric material of the third aspect may have any feature of the polymeric material of the first aspect.

Said component of the third aspect may have any feature of the component of the second aspect.

Said apparatus or device of the third aspect may incorporate a component which includes said polymeric material as described. Said apparatus or device may be arranged to be a substantially permanent part of the oil and/or gas installation during its use or may comprise apparatus or a device which is temporarily or intermittently used in relation to an oil and/or gas installation as described in the first aspect.

Said component, apparatus or device may comprise a component of a type which is arranged to guide the flow of a fluid, facilitate movement between two parts, facilitate support of one or more parts and/or facilitate connection of two or more parts.

Said component, apparatus or device may be selected from seals, back-up rings, plugs and packers, motor winding slot liners, protector thrust bearings, motor pot heads, compressor vanes, bearings and bushes, thrust washers, valve plates and high pressure hoses, downhole sensors, marine risers, subsea umbilicals, hoses and sheaths.

Said component, apparatus or device may be arranged within said oil and/or gas installation at a position wherein it may be (preferably is) subjected to a temperature of greater than 100° C., greater than 150° C. or greater than 200° C. in use. It may be subjected to temperature of less than 350° C. or 300° C. in use.

Said component may be positioned so it is subjected to a pressure of greater than 40 MPa, 80 MPa, 120 MPa or 180 MPa. It may be subjected to a pressure of less than 3000 MPa, less than 260 MPa or less than 220 MPa.

Said component may be positioned so it contacts gas, for example hydrogen sulphide-containing gas in use.

Said component may, at the same time, be subjected to at least two (preferably all three) of the following: a temperature as described (e.g. in the range 150° C. to 350° C.), a pressure as described (e.g. in the range 40 MPa to 300 MPa), and a gas, for example an acidic gas such as containing hydrogen sulphide.

According to a fourth aspect, there is provided the use of a component which comprises a polymeric material or apparatus or a device comprising a polymeric material in an oil and/or gas installation, wherein said polymeric material, component, apparatus, device and/or oil and/or gas installation are as described in any preceding aspect.

Said polymeric material described in the preceding aspects may be prepared in a process comprising selecting a compound of formula

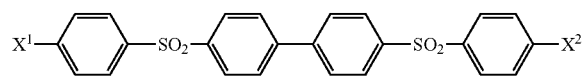
V selecting a compound of formula

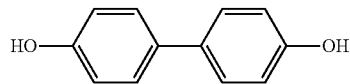
VI and selecting a compound of formula

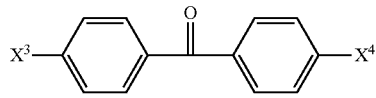
VII and polycondensing said compounds, wherein $X^1$, $X^2$, $X^3$ and $X^4$ independently represent halogen atoms, preferably selected from chlorine and fluorine atoms.

Preferably $X^1$ and $X^2$ represent chlorine atoms. Preferably, $X^3$ and $X^4$ represent fluorine atoms.

The molar proportions of compounds VII and V are suitably in the range 4.2 to 9; preferably in the range 4.8 to 7.3, more preferably in the range 5.2 to 6.2.

Preferably, the number of moles of monomers which include halogen atoms which are polycondensed in the process are at least equal to the number of moles of monomers which include two hydroxy groups. It is especially preferred that the number of moles of monomers which include halogen atoms is slightly greater than the number of moles of monomers which include two hydroxy groups.

Preferably, at least 95 wt %, more preferably at least 99 wt % of monomers used in the process are made up of monomers of formulae V, VI and VII. Preferably, substantially the only monomers used in the process are those of formulae V, VI and VII.

Said process of the second aspect is preferably carried out in the presence of a solvent. The solvent may be of formula

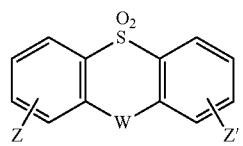

where W is a direct link, an oxygen atom or two hydrogen atoms (one attached to each benzene ring) and Z and Z', which may be the same or different, are hydrogen atoms or phenyl groups. Examples of such aromatic sulphones include diphenylsulphone, dibenzothiophen dioxide, phenoxanthin dioxide and 4-phenylsulphonyl biphenyl. Diphenylsulphone is a preferred solvent.

Said process is preferably carried out in the presence of one or more carbonates which may comprise sodium carbonate, optionally in combination with potassium carbonate.

The total mol % of carbonates used in the process (i.e. the total number of moles of carbonates used in method divided by the total number of moles of hydroxy monomer(s) used, expressed as a percentage) is suitably at least 100%.

The total mol % of carbonates may be greater than 100 mol %. It may be less than 105 mol %.

The mole % of sodium carbonate used in the method may be at least 90 mol %, preferably at least 92 mol %, more preferably at least 95 mol %.

The sum of the mole % (again related to the moles of hydroxy monomer(s)) of sodium carbonate and potassium carbonate used in the method is preferably at least 100 mol % and is more preferably greater than 100 mole %. It may be in the range 100 to 105 mol %.

The mol % of carbonates (which term is intended to encompass carbonate ($CO_3^{2-}$) and bicarbonate ($HCO_3$)) other than sodium carbonate and potassium carbonate used in the method is preferably less than 5 mol %, more preferably less than 1 mol % (again related to the moles of hydroxy monomer(s)).

Preferably, the only carbonates used in the method are sodium carbonate and potassium carbonate.

The process is preferably carried out under substantially anhydrous conditions. In the process, the compounds of formula V, VI and VII are suitably contacted in the presence of said solvent, especially diphenylsulphone. Polymerisation is suitably effected at a temperature within the range 150° C. to 400° C. In the process, the reactants are suitably heated up to a maximum temperature which may be greater than 300° C., for example in the range 300° C. to 350° C. Preferably, however, prior to reaching the maximum temperature, the reagents may be held at one or more temperatures lower than the maximum temperature. For example, the process may involve holding the reagents at a temperature within the range 160° C. to 200° C. for at least 20 minutes; and/or may involve holding the reagents at a temperature within the range 200° C. to 240° C. for at least 60 minutes.

Specific embodiments of the invention will now be described, by way of example, with reference to the accompanying figures, in which.

Figure 1:
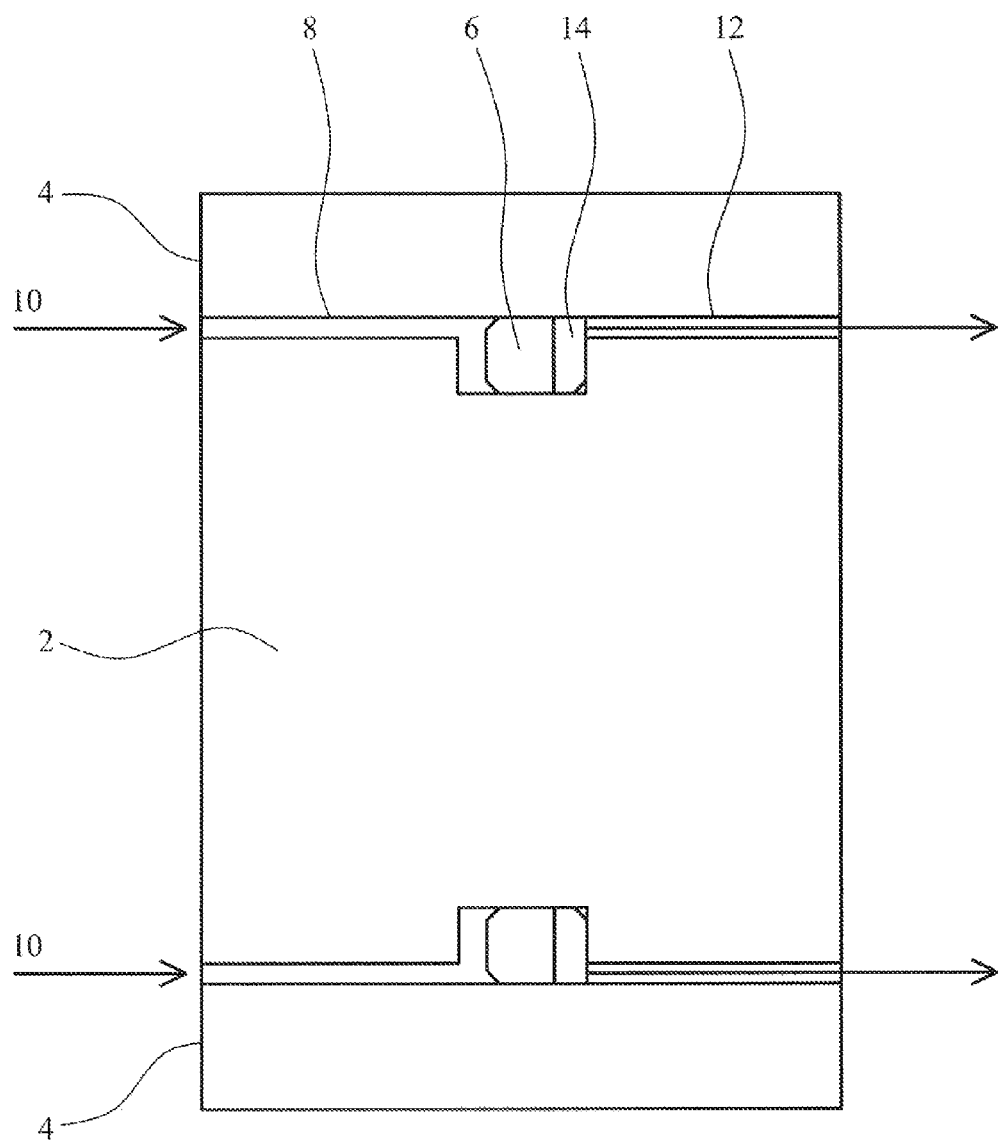
FIG. 1 is a cross-section through an assembly comprising a valve stem and valve housing.

The following materials are referred to hereinafter:

PEEK—refers to Victrex® PEEK 450G; polyetheretherketone having an MV of 0.45 kNsm$^{-2}$, obtained from Victrex Manufacturing Ltd;

PEK—refers to Victrex® HT™ G22; polyetherketone having an MV of 0.22 kNsm$^{-2}$, obtained from Victrex Manufacturing Ltd.

In the following examples, the preparation and testing of polymeric materials are described.

EXAMPLE 1

4,4'-dihydroxybiphenyl (95.47 g, 0.5 mol), 4,4'-bis(4-chlorophenylsulphonyl)biphenyl (37.76 g, 0.075 mol), 4,4'-difluorobenzophenone (BDF) (95.47 g, 0.4375 mol) and diphenylsulfone (422.7 g) were weighed into a 1 liter flanged flask. The flask was fitted with a mechanical stirrer (set at 125 rpm), a PTFE stirrer gland and a lid containing a condenser, nitrogen inlet, thermocouple inlet and inlet port. The mixture was stirred under nitrogen for 20 minutes at ambient temperature before being lowered into a metal bath at 180° C. Once the contents of the flask were fully molten and the contents temperature reached 180° C., Na$_2$CO$_3$ (54.98 g, 0.5188 mol) and K$_2$CO$_3$ (0.17 g, 0.00125 mol) both sieved to 125 μm were mixed and added to the flask. The contents of the flask were heated to 335° C. at 1° C./min and held at that temperature until the desired MV was reached as indicated by the torque rise on the stirrer. The required torque rise was determined from a calibration graph of torque rise versus MV. The reaction mixture was then poured into a foil tray, allowed to cool, pulverised and milled and then washed with 1 liter of acetone, 1 liter of cold water and then hot (50-70° C.) water until the conductivity of the waste water was <2 μS before drying in an oven at 120° C. overnight.

EXAMPLE 2—EVALUATION OF POLYMERS BY DIFFERENTIAL SCANNING CALORIMETRY (DSC)

A Mettler Toledo, DSC1 Star$^e$ system with FRS5 sensor was used for Differential Scanning Calorimetry (DSC) measurements.

The Glass Transition Temperature (Tg), the Cold Crystallisation Temperature (Tn), the Melting Temperature (Tm) and Heat of Fusions of Nucleation (ΔHn) and Melting (ΔHm) for the polymers from Examples 1 to 14 were determined by DSC.

A sample of polymer powder (5 mg) from each of the examples 1 and 4-11 was scanned by DSC as follows:
1. Perform a preliminary thermal cycle by heating the sample from 30° C. to 450° C. at 20° C./min.
2. Hold for 5 minutes.
3. Cool at 20° C./min to 30° C. and hold for 5 mins.
4. Re-heat from 30° C. to 450° C. at 20° C./min, recording the Tg, Tn, Tm, ΔHn and ΔHm.

From the DSC trace resulting from the scan in step 4, the onset of the Tg was obtained as the intersection of the lines drawn along the pre-transition baseline and a line drawn along the greatest slope obtained during the transition. The Tn was the temperature at which the main peak of the cold crystallisation exotherm reaches a maximum. The Tm was the temperature at which the main peak of the melting endotherm reach maximum.

The Heat of Fusion for melting (ΔHm) was obtained by connecting the two points at which the melting endotherm deviates from the relatively straight baseline. The integrated area under the endotherm as a function of time yields the enthalpy (mJ) of the melting transition: the mass normalised heat of fusion is calculated by dividing the enthalpy by the mass of the specimen (J/g). The level of crystallisation (%) is determined by dividing the Heat of Fusion of the specimen by the Heat of Fusion of a totally crystalline polymer, which is 140 J/g.

EXAMPLE 3—MELT VISCOSITY MEASUREMENT

Melt viscosity was measured on a capillary rheometer operating at 435° C. at a shear rate of 1000 s$^{-1}$ using a tungsten carbide die 0.5 mm×3.175 mm. The MV reading was taken 5 minutes after the polymer had fully melted, which is taken to be 5 minutes after the polymer is loaded into the barrel of the rheometer.

EXAMPLES 4-8

The procedure of Example 1 was followed and the ratio of 4,4'-difluorobenzophenone (BDF) to 4,4'-bis(4-chlorophenylsulphonyl)biphenyl (LCDC) was varied as shown in Table 1. The Tg (onset), Tm, crystallinity and MV, assessed as described in Example 2 and 3 are also shown in the table for examples 1 and 4 to 8.

TABLE 1

| Example | BDF:LCDC (mol %) | MV @ 435° C. | Tg onset (° C.) | Tm (° C.) | X (%) |
|---|---|---|---|---|---|
| 4 | 90:10 | 0.57 | 188 | 408 | 39 |
| 1 | 85:15 | 0.53 | 198 | 403 | 33 |
| 5 | 82.5:17.5 | 0.52 | 202 | 401 | 29 |
| 6 | 80:20 | 0.50 | 203 | 396 | 27 |
| 7 | 75:25 | 0.47 | 213 | 397 | 23 |
| 8 | 70:30 | 0.50 | 207 | 372 | 13 |

EXAMPLE 9—SCALE UP OF EXAMPLE 1

A 300 liter stainless steel reactor fitted with a lid, stirrer/stirrer guide, nitrogen inlet and outlet was charged with diphenylsulphone (115.8 kg) and heated to 160° C. Once the diphenylsulfone had fully melted, 4,4'-dihydroxybiphenyl (25.51 kg, 137 mol) 4,4'-difluorobenzophenone (26.16 kg, 119.9 mol) and LCDC (10.35 kg, 20.55 mol) were charged to the reactor under nitrogen. The contents were then heated to 180° C. and while maintaining a nitrogen blanket, dried sodium carbonate (15.03 kg, 141.8 mol) and potassium carbonate (0.095 kg, 0.685 mol), both sieved through a screen with a mesh of 125 micrometers, were added. The temperature was raised to 230° C. at 1° C./min and held for 60 minutes. The temperature was further raised to 335° C. at 1° C./min and held until desired melt viscosity was reached as determined by the torque rise of the stirrer. The required torque rise was determined from a calibration graph of torque rise versus MV. The reaction mixture was poured via a band caster into a water bath, allowed to cool, milled and washed with 2000 liters of acetone and 4500 liters of water. The resulting polymer powder was dried in a tumble dryer until the contents temperature measured 110° C.

EXAMPLE 10

This was a repeat of Example 9, except that a lower MV polymer was obtained.

EXAMPLE 11

This was a blend of the polymers of Examples 9 and 10 to achieve the specified MV.
Results are provided in Table 2.

TABLE 2

| Example | MV @ 435° C. | Tg onset (° C.) | Tm (° C.) | X (%) |
|---|---|---|---|---|
| 9 | 0.50 | 199 | 405 | 34 |
| 10 | 0.33 | 199 | 405 | 38 |
| 11 | 0.37 | 195 | 405 | 38 |

EXAMPLE 12—MECHANICAL TESTS

Mechanical tests were undertaken on the material of Example 11 and compared to PEEK. Results are provided in Table 3.

TABLE 3

| Test | Example 9 | PEEK |
|---|---|---|
| Tensile strength[1] (MPa) | 73 | 100 |
| Tensile Elongation[1] (%) | 3 | 45 |
| Tensile Modulus[1] (GPa) | 3.3 | 3.7 |
| Flexural Strength[2] (MPa) | 149 | 125 |
| Flexural Modulus[2] (GPa) | 3.2 | 4.1 |

[1]ISO 527
[2]ISO 178

Selected materials were subjected to tests relevant to conditions experienced in many oil and gas installations. In such installations, where a pressure of greater than 69 MPa and greater than 149° C. is experienced, the conditions are known as High Pressure High Temperature (HPHT) conditions.

Few polymers can operate under HPHT conditions; but one polymer which can is PEEK. PEEK was therefore selected for comparison with polymers according to preferred embodiments of the present invention.

EXAMPLE 13—PVT (PRESSURE-VOLUME-TEMPERATURE) DATA

The specific volume of each polymer tested was measured at temperatures up to 420° C. and pressures up to 200 MPa using a PVT (Pressure Volume Temperature) apparatus.

Measurements were performed under isobaric conditions (at 5, 50, 100, 150 and 200 MPa), over a temperature range of 23° C. to 420° C. for each pressure.

The following procedure was used to derive the Tg/pressure relationship.

For each isobaric run, the first inflection point on the specific volume versus temperature curve was identified (1st inflection point is Tg, 2nd is melting point).

The position of the inflection point was determined from the intersection of tangents drawn on the flat parts of the curve either side (of inflection point).

Figure 2:
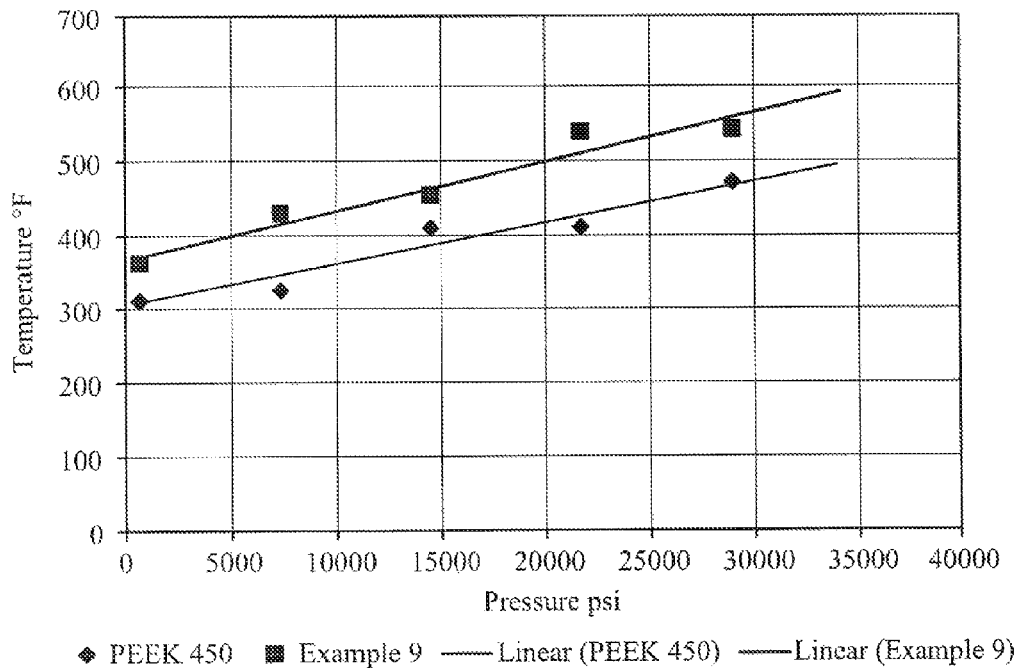
FIG. 2 is a graph of glass transition temperature (Tg) in ° F. versus pressure in psi for two polymers assessed using PVT apparatus.

The resulting Tg values were then used to construct a Tg versus pressure plot, as shown in FIG. 2.

EXAMPLE 14—CREEP/COMPRESSION DATA

The extent of extrusion (creep) was assessed by measuring the depth of the rim of test "seal ring" samples after application of a load.

The polymer from Example 11 together with a sample of PEEK was pre-conditioned in an oven at a temperature of 260° C. (the temperature of the test) for 24 hours. After being machined to the correct size, the "seal rings" were mounted into test jig also at 260° C. and allowed to heat soak for 4 hours before a load of 37 kN was applied to the top of the rings for 2 hours. The load contacts the top of the ring pushing the polymer down (extruding it). Since the diameter of the load is less than that of the ring as it forces the polymer down, a rim is formed on the outside from non-extruded material. The height of the rim gives an indication of the degree extrusion of the polymer.

Under the test conditions the polymers were found to extrude as would be observed in the case of a back-up seal ring operating in a downhole oil and gas environment. The extent of extrusion was assessed by measuring the depth of the rim formed on the "seal ring" after the load was removed by using Vernier callipers at the highest point and then again at 90° to the highest point. Results are provided in Table 4.

TABLE 4

|  | Height of rim at highest point (mm) | Height of rim at 90° to highest point (mm) |
|---|---|---|
| Example 11 | 1.10 | 1.05 |
| PEEK | 2.26 | 2.08 |

Referring to the table, the rim is found to be shallower for the Example 11 material which demonstrates that the polymer extruders less than for PEEK, where the rim is approximately twice as deep.

EXAMPLE 15—SOUR FLUID EXPOSURE TESTING

The resistance of the polymer from Example 11 to sour fluids was measured along with PEEK and PEK for comparison. Sour fluid exposure tests were carried out in hydrogen sulphide gas (CK Gas Products Ltd., Hook UK) environments at high temperature and pressure.

For each exposure test, the specimens were installed in the gas phases within a pressure vessel. Tests were carried out at 175° C. and a pressure of 20 bar to simulate downhole conditions in subsea wells in the oil and gas industry. The ISO-527 test bars were exposed to the fluids for up to 1000 hours.

Figure 3:
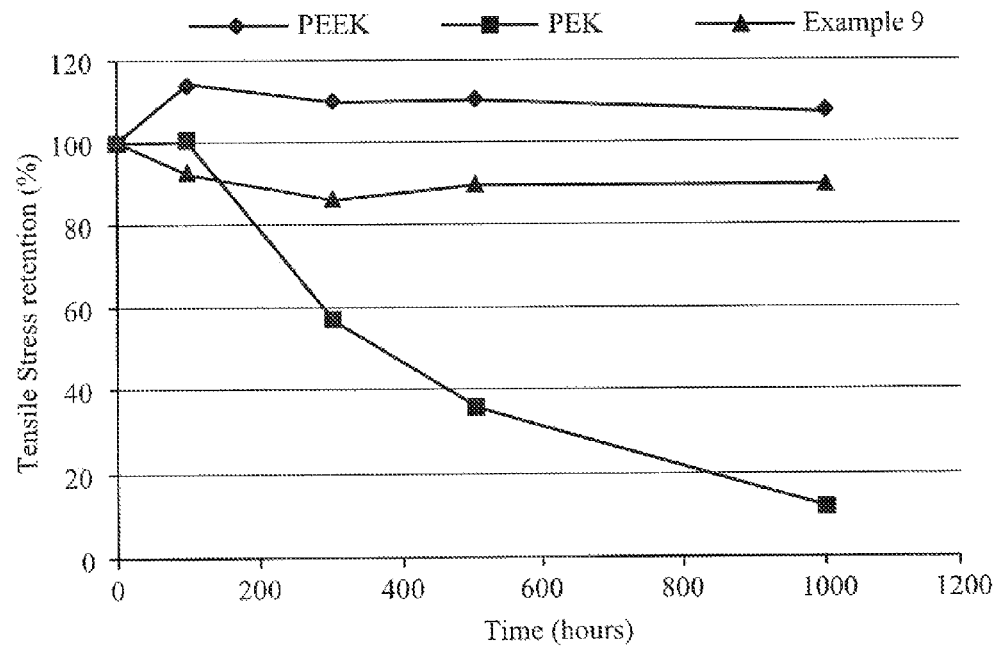
FIG. 3 is a graph of tensile stress retention versus time (hours) for three polymers exposed to sour gas.

Results are represented in FIG. 3.

Discussion

A review of the PVT data shows that polymeric material according to a preferred embodiment shows an improvement in Tg across a range of pressure. Tg pressure dependence for a polymer in an oil and gas environment described herein is believed to be important. In particular, a positive relationship (Tg increasing with pressure) can advantageously enhance mechanical performance. FIG. 2 shows this to be the case for the Example 9 material. However, for PEEK, at an operating pressure of 30,000 psi, the Tg is approximately 480° F. (i.e. below the operating temperature (500° F.)), so it will soften and is likely to extrude. In contrast, the Tg of the Example 9 material is approximately 560° F. (i.e. its Tg is above the operating temperature) meaning the polymer will remain rigid and is unlikely to extrude. Thus the PVT data implies considerable mechanical performance advantages under HPHT conditions, for components made from the polymeric material.

Additionally, the creep/compression data shows that the depth of the rim for the polymeric material according to the preferred embodiment is considerably less in comparison to PEEK, illustrating a clear performance advantage.

Furthermore, the polymeric material according to the preferred embodiment is found to have chemical resistance under simulated subsea conditions (Example 15) comparable to PEEK, while outperforming PEK.

Thus, overall, the polymeric material according to preferred embodiments is advantageous, showing improved properties compared to existing commercially used materials.

The polymeric materials according to preferred embodiments may be used in challenging situations in the oil and gas industry, for example for seals, back-up rings, plugs and packers, motor winding slot liners, protector thrust bearings, motor pot heads, compressor vanes, bearings and bushes, thrust washers, valve plates and high pressure hoses, downhole sensors, marine risers, subsea umbilicals, hoses and sheaths.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An oil and/or gas installation or apparatus for use in relation to an oil and/or gas installation, said installation or apparatus comprising a component which comprises a copolymer, wherein the copolymer comprises a repeat unit of formula

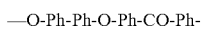
—O-Ph-Ph-O-Ph-CO-Ph-    I and a repeat unit of formula

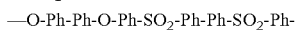
—O-Ph-Ph-O-Ph-SO$_2$-Ph-Ph-SO$_2$-Ph-    II wherein Ph represents a phenylene moiety;
wherein the repeat units I and II are in the relative molar proportions 95:5 to 80:20.

2. The installation or apparatus according to claim 1, wherein hydrogen sulphide and/or sour gas is present in the installation or apparatus.

3. The installation or apparatus according to claim 1, wherein said component is, at the same time, subjected to at least two of the following: a temperature in the range 150° C. to 350° C., a pressure in the range 40 MPa to 300 MPa, and an acidic gas such as containing hydrogen sulphide.

4. The installation or apparatus according to claim 1, wherein said component is selected from the following: seals, back-up rings, plugs and packers, motor winding slot liners, protector thrust bearings, motor pot heads, compressor vanes, bearings and bushes, thrust washers, valve plates, high pressure hoses, downhole sensors, marine risers, subsea umbilicals, hoses and sheaths.

5. The installation or apparatus according to claim 1, wherein said component which comprises said copolymer is arranged to guide the flow of a fluid, restrict the flow of a fluid, facilitate movement between two parts, facilitate support of one or more parts and/or facilitate connection of two or more parts.

6. The installation or apparatus according to claim 5, wherein said component which guides flow of a fluid comprises a carrier for oil and/or gas, wherein the carrier is a hose, a riser, a subsea umbilical or a sheath; wherein said component which restricts the flow of a fluid comprises a seal, back-up ring or plug; and wherein said component which facilitates movement between two parts, facilitates supports of one or more parts or facilitates connection of two or more parts comprises bearings, bushes, washers or valve plates.

7. The installation or apparatus according to claim 1, wherein said component which comprises said copolymer is a seal or back-up ring.

8. The installation or apparatus according to claim 1, wherein said repeat unit of formula I has the structure

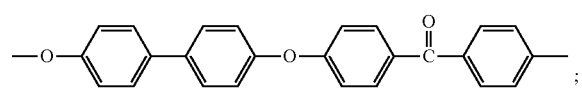

and
said repeat unit of formula II has the structure

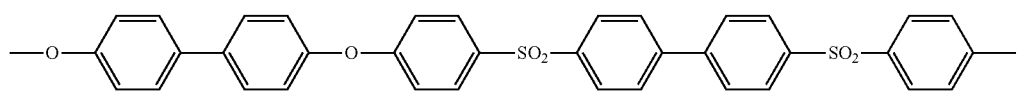

9. The installation or apparatus according to claim 1, wherein said copolymer includes 81% to 90 mol % of repeat units of formula I.

10. The installation or apparatus according to claim 1, wherein said copolymer includes 82% to 88 mol %, of repeat units of formula I.

11. The installation or apparatus according to claim 1, wherein said copolymer includes 10% to 19 mol % of repeat units of formula II.

12. The installation or apparatus according to claim 1, wherein said copolymer includes 12% to 18 mol % of repeat units of formula II.

13. The installation or apparatus according to claim 1, wherein the Tm of said copolymer is in the range 350° C. to 410° C.

14. The installation or apparatus according to claim 1, wherein said copolymer has a crystallinity of at least 25%.

15. The installation or apparatus according to claim 1, wherein said copolymer is part of a composition which includes said copolymer and a filler means.

16. A component which comprises a copolymer wherein the copolymer comprises a repeat unit of formula

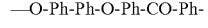
—O-Ph-Ph-O-Ph-CO-Ph-    I and a repeat unit of formula

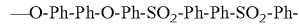
—O-Ph-Ph-O-Ph-SO$_2$-Ph-Ph-SO$_2$-Ph-    II wherein Ph represents a phenylene moiety;
wherein the repeat units I and II are in the relative molar proportions 95:5 to 80:20,
wherein said component is of a type which is arranged to guide the flow of a fluid, facilitate movement between two parts, facilitate support of one or more parts and/or facilitate connection of two or more parts.

17. The component according to claim 16, wherein said component which guides flow of a fluid comprises a carrier for oil and/or gas, wherein the carrier is a hose, a riser, a subsea umbilical or a sheath; said component which restricts the flow of a fluid comprises a seal, back-up ring or plug; and said component which facilitates movement between two parts, facilitates supports of one or more parts or facilitates connection of two or more parts comprises bearings, bushes, washers or valve plates.

18. The component according to claim 16, wherein said copolymer of said component is arranged to directly contact oil and/or gas associated with said installation in use.

19. The component according to claim 16, wherein said component which comprises said copolymer is a seal or back-up ring.

20. A method of assembling a part of an oil and/or gas installation, the method comprising:
(i) selecting a component which comprises a copolymer or selecting apparatus or a device for use in relation to the oil and/or gas installation which comprises said copolymer;
(ii) introducing said component, apparatus or device into said oil and/or gas installation;
wherein said copolymer has a repeat unit of formula —O-Ph-Ph-O-Ph-CO-Ph-      I and a repeat unit of formula —O-Ph-Ph-O-Ph-SO$_2$-Ph-Ph-SO$_2$-Ph-      II wherein Ph represents a phenylene moiety;
wherein the repeat units I and II are in the relative molar proportions 95:5 to 80:20.

* * * * *